United States Patent
Nicolaescu et al.

(10) Patent No.: US 7,046,714 B2
(45) Date of Patent: May 16, 2006

(54) METHOD AND APPARATUS FOR RAMAN RING RESONATOR BASED LASER/WAVELENGTH CONVERTER

(75) Inventors: Remus Nicolaescu, San Francisco, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 10/659,009

(22) Filed: Sep. 10, 2003

(65) Prior Publication Data

US 2005/0053111 A1    Mar. 10, 2005

(51) Int. Cl.
*H01S 3/083* (2006.01)
(52) U.S. Cl. .......................................... 372/94; 372/92
(58) Field of Classification Search ............. 372/6, 372/92, 94
See application file for complete search history.

(56) References Cited

U.S. PATENT DOCUMENTS

| | | | |
|---|---|---|---|
| 4,389,617 A | 6/1983 | Kurnit | |
| 4,571,727 A | 2/1986 | Nishizawa et al. | |
| 4,812,682 A | 3/1989 | Holmes | |
| 5,033,051 A | 7/1991 | Werner | |
| 5,408,492 A * | 4/1995 | Vossler et al. | 372/94 |
| 5,673,281 A | 9/1997 | Byer | |
| 5,832,006 A | 11/1998 | Rice et al. | |
| 6,388,800 B1 | 5/2002 | Christodoulides et al. | |
| 6,433,922 B1 | 8/2002 | Ghera et al. | |
| 6,456,425 B1 | 9/2002 | Foursa et al. | |
| 6,519,082 B1 | 2/2003 | Ghera et al. | |
| 2003/0021302 A1* | 1/2003 | Grudinin et al. | 372/6 |

FOREIGN PATENT DOCUMENTS

| | | |
|---|---|---|
| DE | 4113354 A1 | 10/1992 |
| EP | 0482630 A1 | 4/1992 |
| EP | 0561672 A1 | 9/1993 |
| GB | 2373628 A | 9/2002 |
| JP | 62-120090 | 6/1987 |
| WO | PCT/US 03/34377 | 9/2004 |

OTHER PUBLICATIONS

Claps, R. et al., "Stimulated Raman Scattering in Silicon Waveguides", *Electronics Letters*, vol. 38, No. 22, Oct. 24, 2002.

(Continued)

*Primary Examiner*—Minsun Oh Harvey
*Assistant Examiner*—Dung (Michael) T. Nguyen
(74) *Attorney, Agent, or Firm*—Blakely, Sokoloff, Taylor & Zafman LLP

(57) ABSTRACT

A Raman ring resonator based laser and wavelength converter method and apparatus. In one aspect of the present invention, the disclosed method includes directing a first optical beam of a first wavelength and a first power level into a first ring resonator defined in a semiconductor material. Emission of a second optical beam of a second wavelength is caused in the first ring resonator by propagating the first optical beam around the first ring resonator. The first power level is sufficient to cause the emission of the second optical beam. The first optical beam is directed out of the first ring resonator after a round trip of the first optical beam around the first ring resonator. The second optical beam is recirculated around the first ring resonator to further stimulate the emission of the second optical beam in the first ring resonator.

29 Claims, 4 Drawing Sheets

OTHER PUBLICATIONS

Claps, R. et al., "Observation of Raman Emission in Silicon Waveguides at 1.54 μm", *Optics Express*, Vo. 10, No. 22, Nov. 4, 2002, pp. 1305-1313.

Claps, R. et al., "Observation of Stimulated Raman Amplification in Silicon Waveguides", *Optics Express*, vol. 11, No. 15, Jul. 28, 2003, pp. 1731-1739.

Ralston, J. M. et al., "Spontaneous-Raman-Scattering Efficiency and Stimulated Scattering in Silicon", Physical Review B, vol. 2, No. 6, Sep. 15, 1970, pp. 1858-1862.

Saito, T. et al., "Spontaneous Raman Scattering In [100], [110], and [11-2] Directional GaP Waveguides", Journal of Applied Physics, vol. 90, No. 4, Aug. 15, 2001, pp. 1831-1835.

Saito, T. et al., "Raman Gain and Optical Loss in AlGaP Waveguides", Journal of Applied Physics, vol. 87, No. 7, Apr. 1, 2000, pp. 3399-3403.

Suto, K. et al., "Semiconductor Raman Amplifier for Terahertz Bandwidth Optical Communication", Journal of Lightwave Technology, vol. 20, No. 4, Apr. 2002, pp. 705-711.

Tang, C.K. et al., "Development of a Library of Low-Loss Silicon-On-Insulator Optoelectronic Devices", *IEEE Proceedings: Optoelectronics*, vol. 143, No. 5, Oct. 1996, pp. 312-315.

* cited by examiner

METHOD AND APPARATUS FOR RAMAN RING RESONATOR BASED LASER/WAVELENGTH CONVERTER

BACKGROUND OF THE INVENTION

1. Field of the Invention

Embodiments of invention relate generally to optical devices and, more specifically but not exclusively relate to semiconductor-based optical amplification.

2 Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include lasers, WDM transmitters and receivers, optical filters such as diffraction gratings, thin-film filters, fiber Bragg gratings, arrayed-waveguide gratings and optical add/drop multiplexers.

Lasers are well known devices that emit light through stimulated emission and produce coherent light beams with a frequency spectrum ranging from infrared to ultraviolet and may be used in a vast array of applications. In optical communications or networking applications, semiconductor lasers may be used to produce light or optical beams on which data or other information may be encoded and transmitted.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for a Raman ring resonator based laser/wavelength converter are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
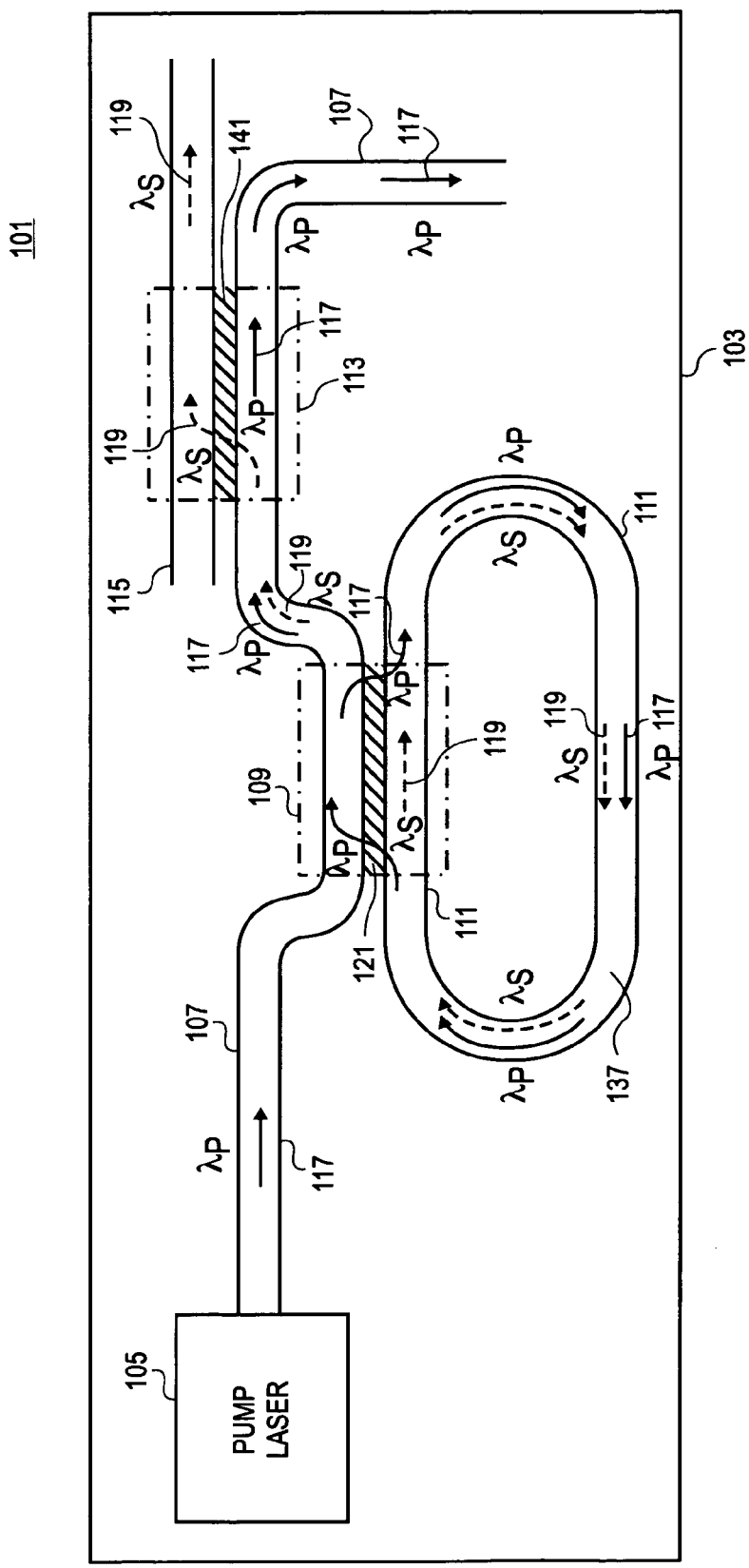
FIG. 1 is a block diagram illustrating a silicon-based stimulated Raman scattering (SRS) laser/wavelength converter, according to one embodiment of the present invention.

FIG. 1 illustrates an optical device 101 including semiconductor material 103 having disposed thereon a silicon-based stimulated Raman scattering (SRS) laser/wavelength converter, according to one embodiment of the present invention. In one embodiment, optical device 101 is implemented using a silicon substrate for semiconductor material 103. In one embodiment, semiconductor material 103 is part of a silicon-on-insulator (SOI) wafer. As shown in the depicted embodiment, optical device 101 includes a pump laser 105, which generates a first optical beam 117 of a first wavelength $\lambda_P$ having a first power level. Optical beam 117 is directed from pump laser 105 through a first optical waveguide 107 defined in semiconductor material 103.

In one embodiment, a first wavelength selective optical coupler 109 is coupled to receive optical beam 117 at one of two inputs of optical coupler 109. As shown in the embodiment of FIG. 1, optical coupler 109 includes first optical waveguide 107 and second optical waveguide 111 disposed in semiconductor material 103. An insulating region 121 is disposed between optical waveguides 107 and 111 to provide a coupling region in semiconductor material 103 between optical waveguides 107 and 111. In this embodiment, the optical waveguides of optical device 101, including optical waveguides 107 and 111, are each implemented in a silicon substrate so as to have silicon cores. In other embodiments, these waveguides may have a core formed from a different material or materials.

For explanation purposes, as shown in FIG. 1, the first input and first output of optical coupler 109 correspond to the input and output, respectively, of the first optical waveguide 107 portion of optical coupler 109. Similarly, the second input and second output of optical coupler 109 correspond to the input and output, respectively, of the second optical waveguide 111 portion of optical coupler 109.

In embodiment depicted in FIG. 1, the second output of optical coupler 109 is optically coupled back to the second input of optical coupler 109, which defines a first ring resonator 137 in semiconductor material 103. In operation, first optical beam 117 is received at the first input of optical coupler 109 through first optical waveguide 107. As will be discussed in greater detail below, optical coupler 109 is wavelength selective and therefore transfers first optical beam 117 of wavelength $\lambda_P$ from first optical waveguide 107 to the second output of optical coupler 109 through second optical waveguide 111. Accordingly, first optical beam 117 is propagated around ring resonator 137 through second optical waveguide 111.

In one embodiment, after one round trip around ring resonator 137, optical coupler 109 receives first optical beam 117 of wavelength $\lambda_P$ at the second input through second optical waveguide 111. Since optical coupler 109 is wavelength selective, first optical beam 117 is then transferred from second optical waveguide 111 back to first optical waveguide 107 to the first output of optical coupler 109.

In accordance with the teachings of the present invention, pump laser 105 provides an optical pump signal for use in amplifying an optical input signal of a selected frequency via stimulated Raman scattering (SRS). SRS can occur in a medium propagating an optical signal of a given frequency (i.e., a pump signal) if the optical signal exceeds a threshold intensity for that material and frequency. When SRS occurs in the medium, some of the energy of the pump signal is converted to light of a different frequency. This difference or shift in frequency is called the Stokes frequency shift. For example, in silicon, the first order Stokes frequency shift is approximately 15.6 THz.

Therefore, in the illustrated embodiment, pump laser 105 outputs the pump signal with first optical beam 117 of wavelength $\lambda_P$ via first optical waveguide 107. First optical beam 117 is transferred to propagate around ring resonator 137. In one embodiment, pump laser 105 is implemented with a laser diode lasing in the 1400 nm wavelength range and having a power output ranging from 300–500 mW. It is appreciated that these wavelength and power output range values are provided for explanation purposes and that other wavelength and/or power output range values may also be employed in other embodiments in accordance with the teachings of the present invention. As will be discussed in greater detail below, in one embodiment, the power level of first optical beam 117 is sufficient to cause emission of a second optical beam 119 of a second wavelength $\lambda_S$ in ring resonator 137.

A value for the SRS gain coefficient for a material pumped at a wavelength $\lambda_p$ can be found by Equation 1:

$$g = 16\pi^3 c^2 S / (\hbar \omega_S^3 n_S^2 (N_0+1) \Gamma) \tag{1}$$

where S is the spontaneous Raman scattering coefficient (proportional to $\omega_S^4$), h is Planck's constant, $n_S$ is the refractive index of the waveguide core material at the Stoke's frequency, $\omega_S$, is the angular frequency of the Stokes emission, $N_0$ is the Bose factor and $\Gamma$ is one half the full width at half maximum of the Stokes line (in units of angular frequency). Equation 1 (due to the $\omega_S^4$ factor of S) shows that the gain coefficient is linearly dependent on the Stokes angular frequency.

Therefore, in one embodiment, the second wavelength $\alpha_S$ of the second optical beam 119 propagating around ring resonator 137 corresponds to a frequency substantially equal to the first order Stokes frequency of the first optical beam 117. In operation, the second optical beam 119 is received at the second input of optical coupler 109 through second optical waveguide 111.

As mentioned above, optical coupler 109 is designed in one embodiment to be wavelength selective such that most or substantially all of second optical beam 119 received at the second input of optical coupler 109 is output from the second output of optical coupler 109 through second optical waveguide 111. As a result, most or substantially all of second optical beam 119 remains in ring resonator 137 is recirculated and therefore continues to propagate around and around ring resonator 137 through second optical waveguide 111. As second optical beam 119 propagates with the pump signal, first optical beam 117, through ring resonator 137, second optical beam 119 is amplified via SRS in ring resonator 137. In addition, it can also be described that lasing occurs in ring resonator 137 with the medium of ring resonator 137 functioning as a lasing medium stimulating the emission of second optical beam 119 as it is recirculated around ring resonator 137.

The gain provided by one embodiment of a silicon-based SRS amplifier can be estimated as follows. Experimental data is published for SRS in silicon at 77° K, $\lambda_P$ of 1064 nm and scattering in the [111] direction with respect to the crystalline axis of silicon. Using this experimental data, the SRS gain coefficient for silicon using current telecommunication operating parameters can be predicted. For example, telecommunication systems typically operate at room temperature, with pump light having a wavelength in the 1400 nm range with the corresponding signal in the 1500 nm range. In addition, optical signal propagation in silicon devices is typically in the [100] and [110] crystalline axes instead of [111] as in the experimental data.

Using these parameters and determining correction factors for these parameters from the experimental data, the gain coefficient can be estimated for a waveguide device operating with pump wavelength between 1400 and 1500 nm and waveguide direction along the [100] or [110] directions. Therefore, it is appreciated that optical device 101 functions as a laser and/or an amplifier with second optical beam 119 being stimulated and amplified in ring resonator 137 according to embodiments of the present invention. In addition, it is further appreciated that optical device 101 also functions as a wavelength converter as first optical beam 117 of a wavelength $\lambda_P$ is used to generate, and is therefore converted to, second optical beam 119 of wavelength $\lambda_S$ in accordance with the teachings of the present invention.

Referring back to the embodiment illustrated in FIG. 1, first optical beam 117 and a leaked portion of second optical beam 119 are directed from the first output of optical coupler 109 through first optical waveguide 107 to an input of a second wavelength selective optical coupler 113 disposed in semiconductor material 103. As shown in the embodiment of FIG. 1, optical coupler 113 includes first optical waveguide 107 and a third optical waveguide 115 disposed in semiconductor material 103. An insulating region 141 is disposed between optical waveguides 107 and 115 to provide a coupling region in semiconductor material 103 between optical waveguides 107 and 115.

For explanation purposes, as shown in FIG. 1, the input and first output of optical coupler 113 correspond to the input and output, respectively, of the first optical waveguide 107 portion of optical coupler 113. Similarly, the second output of optical coupler 113 corresponds to the output of the second optical waveguide 115 portion of optical coupler 113 on the upper right hand side of the diagram.

In one embodiment, optical coupler 113 is wavelength selective and therefore transfers second optical beam 119 of wavelength $\lambda_S$ from first optical waveguide 107 to the second output of optical coupler 113 through optical waveguide 115. Therefore, in the illustrated embodiment, the stimulated second optical beam 119 is output from optical device 101 from the output of optical waveguide 115 in accordance with the teachings of the present invention. The pump optical beam 117 is output from first optical waveguide 107 in accordance with the teachings of the present invention.

Figure 2B:
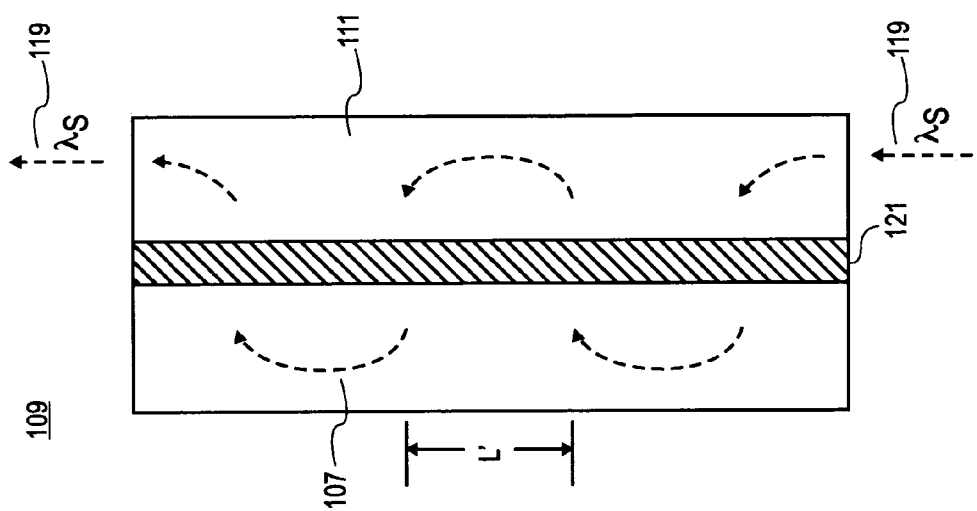
FIG. 2B is an illustration showing an evanescent coupling of a second optical beam of a second wavelength through an insulating region between two waveguides of one embodiment of a wavelength selective optical coupler in accordance with the teachings of the present invention.
Figure 2A:
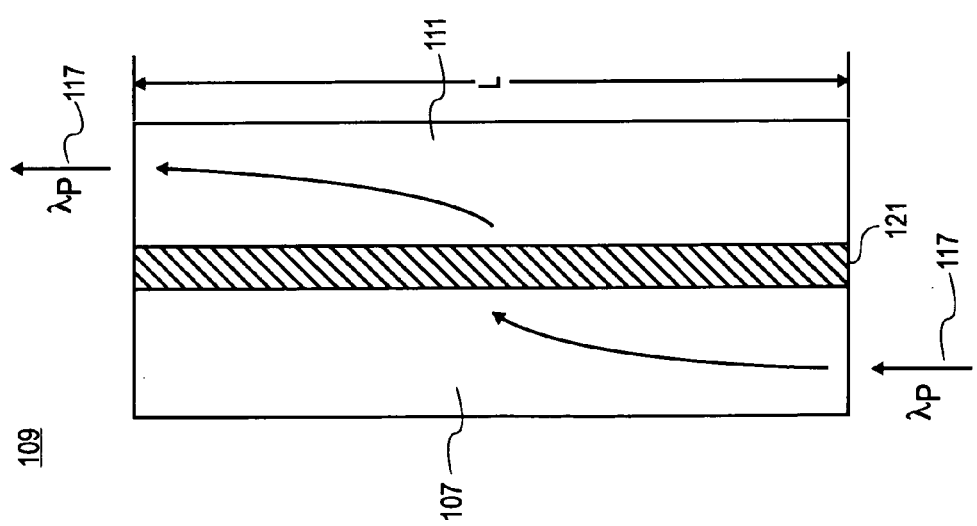
FIG. 2A is an illustration showing an evanescent coupling of a first optical beam of a first wavelength through an insulating region between two waveguides of one embodiment of a wavelength selective optical coupler in accordance with the teachings of the present invention.

Referring now to FIG. 2A, a diagram showing greater detail of one embodiment of optical coupler 109 is illustrated. As discussed above, optical coupler 109 includes first optical waveguide 107 and second optical waveguide 111 disposed in semiconductor material 103. Insulating layer 121 is disposed between optical waveguides 107 and 111 to provide a coupling region in optical coupler 109. As shown in the depicted embodiment, first optical beam 117 of wavelength $\lambda_P$ is illustrated being directed into the first input of optical coupler 109 through optical waveguide 109. In comparison, FIG. 2B is a diagram showing second optical beam 119 of wavelength $\lambda_S$ being directed into the second input of optical coupler 109 through second optical waveguide 111.

As can be appreciated from FIGS. 2A and 2B, the illustrated embodiment of optical coupler 109 features different evanescent coupling lengths or strengths depending on the wavelength of the incident optical beam. Indeed, FIG. 2A shows that the coupling length of first optical beam 117 of wavelength $\lambda_P$ is L, while FIG. 2B shows the coupling length of second optical beam 119 of wavelength $\lambda_S$ is L'.

With a coupling length L for first optical beam 117, optical coupler 109 in one embodiment is wavelength selective by evanescently coupling first optical beam 117 of wavelength $\lambda_P$ from first optical waveguide 107 to output first optical beam 117 from the output of second optical waveguide 111. Similarly, in one embodiment, optical coupler 109 is wavelength selective by evanescently coupling second optical beam 119 of wavelength $\lambda_S$ back and forth between optical waveguides 107 and 109 with a coupling length L' to output second optical beam 119 from the output of optical waveguide 109.

It is appreciated of course that the lengths of L and L' as illustrated in FIGS. 2A and 2B are not necessarily to scale and are shown for explanation purposes. In one embodiment, the length of the coupling region 121 is appropriately sized according coupling lengths L and L' such that optical beams having wavelengths $\lambda_P$ and $\lambda_S$ are separated as shown.

It is appreciated that in the illustrated embodiment, if first optical beam 117 is instead directed into the second input of optical coupler 109 through second optical waveguide 111, optical beam 117 would be output from the first output of optical coupler 109 through first optical waveguide 107.

It is further appreciated that in another embodiment, the coupling length of optical coupler 109 could be adjusted or resized such that first optical beam 117 is output from optical coupler 109 through the same optical waveguide in which it is directed while second optical beam 119 is output from the optical waveguide opposite from the optical waveguide in which it is directed. Such an embodiment would correspond to for example optical coupler 113 in accordance with the teachings of the present invention.

Figure 3:
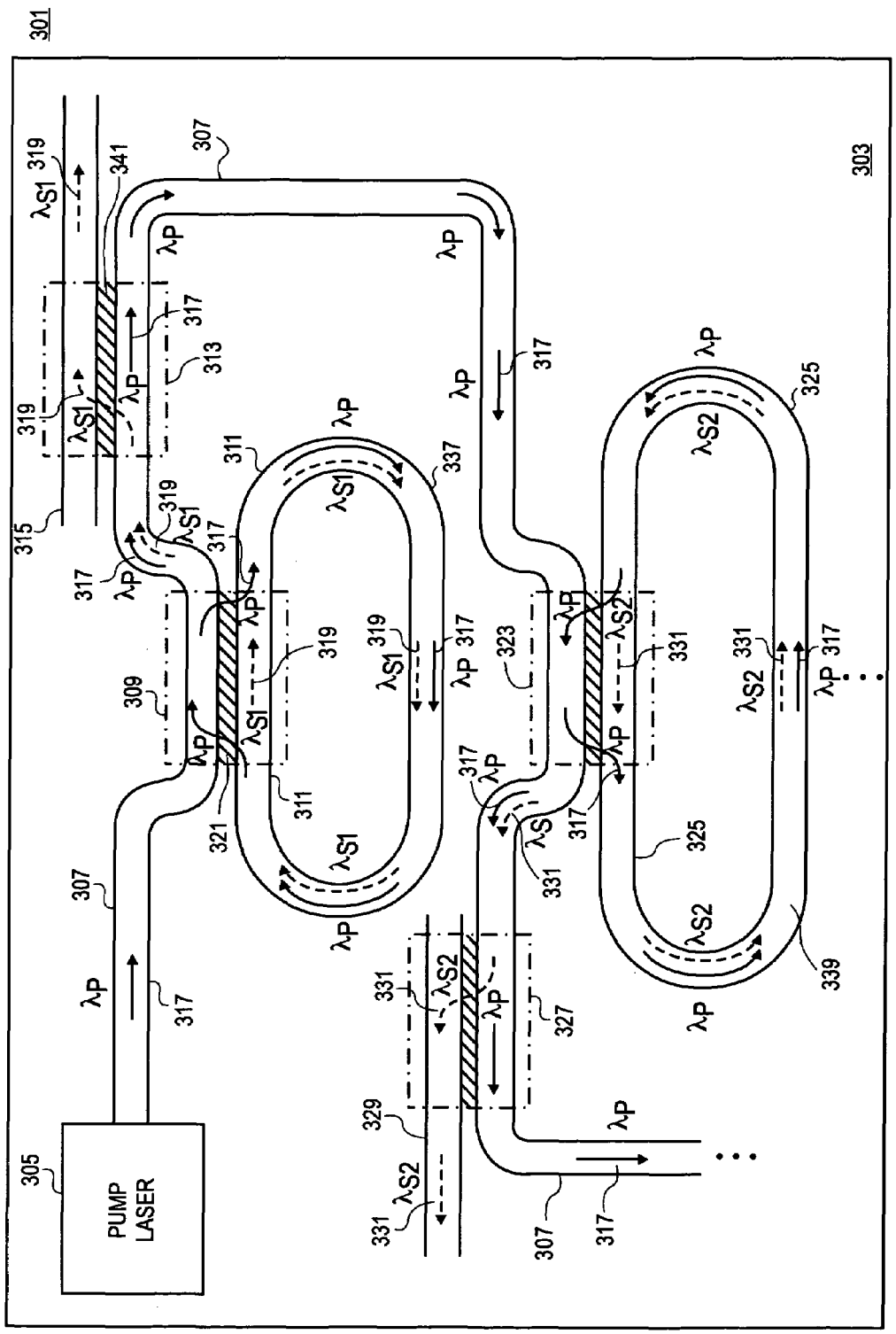
FIG. 3 is a block diagram illustrating a silicon-based SRS laser/wavelength converter generating two outputs, according to one embodiment of the present invention.

Referring now to FIG. 3, an embodiment of an optical device 301, which is an extension of the embodiment of the silicon-based SRS laser/wavelength converter disposed in semiconductor material 303, in accordance with the teachings of the present invention. Similar to optical device 101 of FIG. 1, one embodiment of optical device 301 of FIG. 3 is implemented using a silicon substrate for semiconductor material 303. As shown in the depicted embodiment, optical device 301 includes a pump laser 305, which generates a first optical beam 317 of a first wavelength $\lambda_P$ having a first power level. Optical beam 317 is directed from pump laser 305 through a first optical waveguide 307 defined in semiconductor material 303.

In one embodiment, a first wavelength selective optical coupler 309 is coupled to receive optical beam 317 at one of two inputs of optical coupler 309. As shown in the embodiment of FIG. 3, optical coupler 309 includes first optical waveguide 307 and second optical waveguide 311 disposed in semiconductor material 303. Insulating region 321 is disposed between optical waveguides 307 and 311 to provide a coupling region in semiconductor material 303 between optical waveguides 307 and 311.

In embodiment depicted in FIG. 3, the second output of optical coupler 309 is optically coupled back to the second input of optical coupler 309 to define a first ring resonator 337 in semiconductor material 303. In operation, first optical beam 317 is received at the first input of optical coupler 309 through first optical waveguide 307. Similar to optical coupler 109 of FIG. 1, optical coupler 309 of FIG. 3 is wavelength selective and therefore transfers first optical beam 317 of wavelength $\lambda_P$ from first optical waveguide 307 to the second output of optical coupler 309 through second optical waveguide 311. Accordingly, first optical beam 317 is propagated around first ring resonator 337 through second optical waveguide 311.

In one embodiment, after one round trip around first ring resonator 337, optical coupler 309 receives first optical beam 317 of wavelength $\lambda_P$ at the second input through second optical waveguide 311. Since optical coupler 109 is wavelength selective, first optical beam 317 is then transferred from second optical waveguide 311 back to first optical waveguide 307 to the first output of optical coupler 309.

Similar to pump laser 105 of FIG. 1, one embodiment of pump laser 305 provides an optical pump signal for use in amplifying an optical signal of a selected frequency via SRS. Therefore, in one embodiment, the power level of first optical beam 317 is sufficient to cause emission of a second optical beam 319 of a second wavelength $\lambda_{S1}$ in first ring resonator 337, similar to what occurs in optical device 101 of FIG. 1. In one embodiment, the second wavelength $\lambda_{S1}$ of the second optical beam 319 propagating around first ring resonator 337 corresponds to a frequency substantially equal to the first order Stokes frequency of the first optical beam 317.

Similar to optical coupler 109 of FIG. 1, optical coupler 309 of FIG. 3 is also designed to be wavelength selective such that most of second optical beam 319 received at the second input of optical coupler 309 is output from the second output of optical coupler 309 through second optical waveguide 311. As a result, most or substantially all of second optical beam 319 remains in first ring resonator 337 is recirculated and therefore continues to propagate around and around first ring resonator 337 through second optical waveguide 311. As second optical beam 319 propagates with the pump signal, first optical beam 317, through ring resonator 337, second optical beam 319 is amplified via SRS in first ring resonator 337. In addition, it can also be described that lasing occurs in first ring resonator 337 with the medium of ring resonator 337 functioning as a lasing medium stimulating the emission of second optical beam 319 as it is recirculated around first ring resonator 337.

Similar to optical device 101, first optical beam 317 and a leaked portion of second optical beam 319 are directed from the first output of optical coupler 309 through first optical waveguide 307 to an input of a second wavelength selective optical coupler 313 disposed in semiconductor material 303. As shown in the embodiment of FIG. 3, optical coupler 313 includes first optical waveguide 307 and a third optical waveguide 315 disposed in semiconductor material 303. An insulating region 341 is disposed between optical waveguides 307 and 315 to provide a coupling region in semiconductor material 303 between optical waveguides 307 and 315.

In one embodiment, optical coupler 313 is wavelength selective and therefore transfers second optical beam 319 of wavelength $\lambda_{S1}$ from first optical waveguide 307 to the second output of optical coupler 313 through optical waveguide 315. Therefore, in the illustrated embodiment, the stimulated second optical beam 319 is output from optical device 301 from the output of optical waveguide 315 in accordance with the teachings of the present invention. The pump optical beam 317 is output from first optical waveguide 307 in accordance with the teachings of the present invention.

In the embodiment illustrated in FIG. 3, it is appreciated that the structure of first optical coupler 309, first ring resonator 337 and second optical coupler 313 is substantially replicated and cascaded in semiconductor 303 such that the subsequent structure is coupled to receive pump optical beam 317 through first optical waveguide 307. In particular, as shown in the depicted embodiment, a third optical coupler 323, a second ring resonator 339 and a fourth optical coupler 327 are also disposed in semiconductor material 303. In one embodiment, third optical coupler 323, second ring resonator 339 and fourth optical coupler 327 are arranged and function in a substantially similar fashion to their counterpart structural elements first optical coupler 309, first ring resonator 337 and second optical coupler 313, respectively.

Therefore, as shown in the illustrated embodiment, third optical coupler 323 is coupled to receive first optical beam 317 from second optical coupler 313 through first optical waveguide 307. The first optical beam 317 is then directed for a round trip propagation through a second ring resonator 339 through a fourth optical waveguide 325. First optical beam 317 has a power level sufficient to cause emission of a third optical beam 331 of a third wavelength $\lambda_{S2}$ when first optical beam 317 is propagated around second ring resonator 339 via SRS and lasing occurring in second ring resonator 339.

In one embodiment, third optical coupler is adapted to direct first optical beam 317 out from second ring resonator 339 after a round trip while directing most or substantially all of third optical beam 331 to remain within second ring resonator 339. Fourth optical coupler 327 in one embodiment is coupled to receive first optical beam 317 as well as a portion of third optical beam 331 that is leaked from third optical coupler 323 through first optical waveguide 307. Similar to second optical coupler 323, fourth optical coupler 327 is wavelength selective such that the third optical beam 331 of the third wavelength $\lambda_{S2}$ is directed from fourth optical coupler 327 through a fifth optical waveguide 329 while first optical beam 317 is directed from fourth optical 327 through optical waveguide 317.

In one embodiment, it is appreciated that the replicated structure of first optical coupler 309, first ring resonator 337 and second optical coupler 313 may be replicated a plurality of times and cascaded to the previous structures to generate a plurality of stimulated optical beams in respective ring resonators via SRS and lasing in accordance with the teachings of the present invention.

It is appreciated that in the embodiment illustrated in FIG. 3, second ring resonator 339 has a different round trip distance than first ring resonator 337 and that third optical beam 331 is stimulated to have a different wavelength $\lambda_{S2}$ than the wavelength $\lambda_{S1}$ of stimulated second optical beam 319. In other embodiments, it is appreciated that the wavelengths of optical beams stimulated in the ring resonators via SRS and lasing as well as the round trip distances of the ring resonators can be adjusted to be equal or different values in accordance with the teachings of the present invention.

Figure 4:
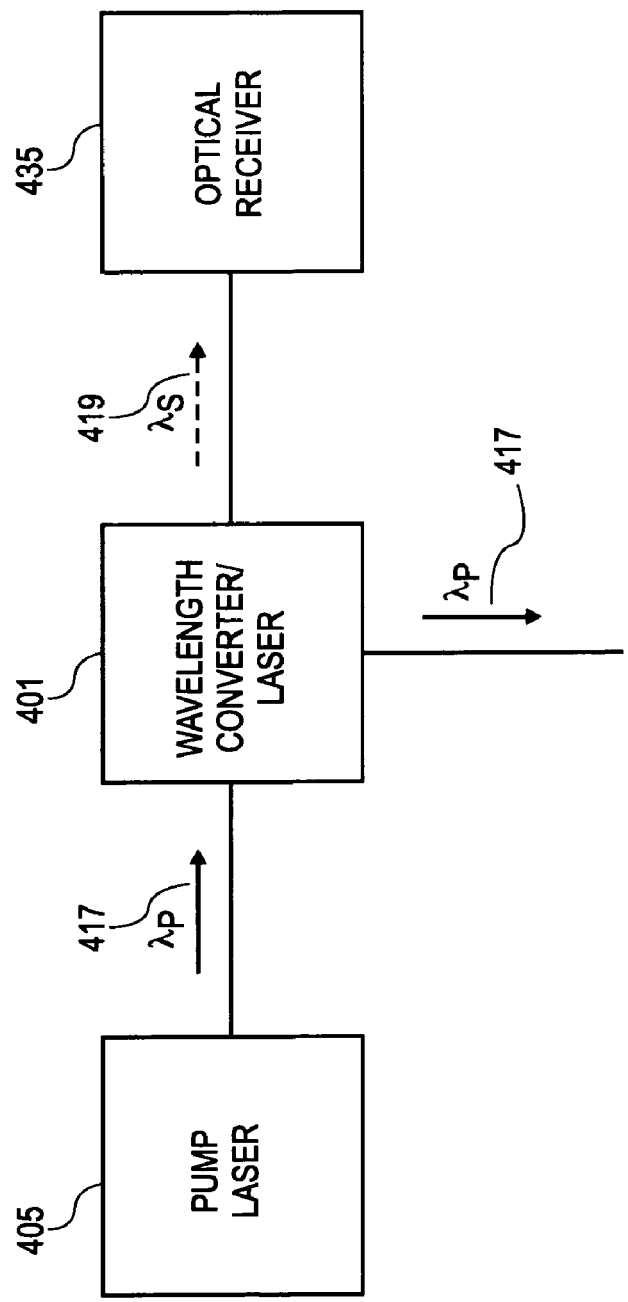
FIG. 4 is a block diagram illustration of a system including an optical device employing a silicon-based SRS laser/wavelength converter according to embodiments of the present invention.

FIG. 4 is a block diagram illustration of a system including an optical device employing a silicon-based SRS laser/wavelength converter according to embodiments of the present invention. In the depicted embodiment, system 433 includes a pump laser 405 adapted to generate a pump signal or a first optical beam 417 having a wavelength $\lambda_P$ having a first power level.

First optical beam 417 is then received by an optical device 401, which in one embodiment is a wavelength converter or laser in accordance with the teachings of the present invention. In one embodiment, optical device 401 is similar to for example an embodiment of optical device 101 of FIG. 1. In one embodiment, pump laser 405 is external to semiconductor material in which optical device 401 is disposed. In another embodiment, pump laser may be disposed in the semiconductor material in which optical device 401 is disposed.

In one embodiment, optical device 401 is adapted to receive first optical beam and stimulate the emission of a second optical beam of a wavelength $\lambda_S$. In one embodiment, the power level of first optical beam 417 is a sufficient to cause emission of second optical beam in a ring resonator included in optical device 401 via SRS and lasing in accordance with the teachings of the present invention.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method, comprising:
   directing a first optical beam of a first wavelength and a first power level into a first ring resonator defined in a semiconductor material;
   causing emission of a second optical beam of a second wavelength in the first ring resonator by propagating the first optical beam around the first ring resonator, wherein the first power level is sufficient to cause the emission of the second optical beam; and
   directing the first optical beam out of the first ring resonator after a round trip of the first optical beam around the first ring resonator; and
   recirculating the second optical beam around the first ring resonator to further stimulate the emission of the second optical beam in the first ring resonator; and
   generating the second optical beam as an output from the first ring resonator by leaking out a portion of the second optical beam recirculated around the first ma resonator.

2. The method of claim 1 wherein generating the second optical beam as the output from the first ring resonator further includes separating the second optical beam leaked out from the first optical beam directed out of the first ring resonator.

3. The method of claim 1 further comprising:
   directing the first optical beam directed out from the first ring resonator into a second ring resonator defined in the semiconductor material;
   causing emission of a third optical beam of a third wavelength in the second ring resonator by propagating the first optical beam around the second ring resonator, wherein the first power level is sufficient to cause the emission of the third optical beam; and directing the first optical beam out of the second ring resonator after a round trip of the first optical beam around the second ring resonator; and recirculating the third optical beam around the second ring resonator to further stimulate the emission of the third optical beam in the second ring resonator.

4. The method of claim 3 further comprising generating the third optical beam as an output from the second ring resonator by leaking out a portion of the third optical beam recirculated around the second ring resonator.

5. The method of claim 4 wherein generating the third optical beam as the output from the second ring resonator further includes separating the third optical beam leaked out from the first optical beam directed out of the second ring resonator.

6. The method of claim 1 wherein causing the emission of the second optical beam of the second wavelength in the first ring resonator comprises causing stimulated Raman scattering (SRS) in the first ring resonator with the first optical beam.

7. The method of claim 6 wherein the second optical beam has a frequency that is substantially equal to a Stokes frequency of the SRS that occurs in the first ring resonator.

8. The method of claim 3 wherein causing the emission of the third optical beam of the third wavelength in the second ring resonator comprises causing stimulated Raman scattering (SRS) in the second ring resonator with the first optical beam.

9. The method of claim 8 wherein the third optical beam has a frequency that is substantially equal to a Stokes frequency of the SRS that occurs in the second ring resonator.

10. An apparatus, comprising:
a first optical coupler defined in a semiconductor material, the first optical coupler including first and second inputs and first and second outputs; and
a first ring resonator defined in the semiconductor material with the second output of the first optical coupler optically coupled to the second input of the first optical coupler through the first ring resonator, the first optical coupler to transfer a first optical beam of a first wavelength having a first power level received at the first input of the first optical coupler to the second output of the first optical coupler, the first optical coupler to transfer the first optical beam received at the second input of the first optical coupler to the first output of the first optical coupler, wherein the first power level is sufficient to cause emission of a second optical beam of a second wavelength when the first optical beam is propagated in the first ring resonator, the first optical coupler to transfer most of the second optical beam received at the second input of the first optical coupler to the second output of the second optical coupler.

11. The apparatus of claim 10 further comprising a second optical coupler defined in the semiconductor material, the second optical coupler including an input and first and second outputs, the input of the second optical coupler optically coupled to the first output of the first optical coupler, the second optical coupler to transfer the first optical beam received at the input of the second optical coupler to the first output of the second optical coupler, the second optical coupler to transfer the second optical beam leaked from the first ring resonator and received at the input of the second optical coupler to the second output of the second optical coupler.

12. The apparatus of claim 11 further comprising:
a third optical coupler defined in the semiconductor material, the third optical coupler including first and second inputs and first and second outputs, the first input of the third optical coupler optically coupled to the first output of the second optical coupler; and
a second ring resonator defined in the semiconductor material with the second output of the third optical coupler optically coupled to the second input of the third optical coupler through the second ring resonator, the third optical coupler to transfer the first optical beam received at the first input of the third optical coupler to the second output of the third optical coupler, the third optical coupler to transfer the first optical beam received at the second input of the third optical coupler to the first output of the third optical coupler, wherein the first power level is sufficient to cause emission of a third optical beam of a third wavelength when the first optical beam is propagated in the third ring resonator, the third optical coupler to transfer most of the third optical beam received at the second input of the third optical coupler to the second output of the third optical coupler.

13. The apparatus of claim 12 further comprising a fourth optical coupler defined in the semiconductor material, the fourth optical coupler including an input and first and second outputs, the input of the fourth optical coupler optically coupled to the first output of the third optical coupler, the fourth optical coupler to transfer the first optical beam received at the input of the fourth optical coupler to the first output of the fourth optical coupler, the fourth optical coupler to transfer the third optical beam leaked from the second ring resonator and received at the input of the fourth optical coupler to the second output of the fourth optical coupler.

14. The apparatus of claim 10 wherein the semiconductor material comprises silicon and wherein waveguides included in the first ring resonator and the first optical coupler include respective cores comprised of silicon.

15. The apparatus of claim 10 wherein the first optical beam causes stimulated Raman scattering (SRS) in the first ring resonator.

16. The apparatus of claim 15 wherein the second optical beam has a frequency that is substantially equal to a Stokes frequency of the SRS that occurs in the first ring resonator.

17. The apparatus of claim 12 wherein the first optical beam causes SRS in the second ring resonator.

18. The apparatus of claim 17 wherein the third optical beam has a frequency that is substantially equal to a Stokes frequency of the SRS that occurs in the second ring resonator.

19. The apparatus of claim 10 wherein the first optical coupler comprises:
a first optical waveguide disposed in the semiconductor material between the first input and the first output of the first optical coupler;
a second optical waveguide disposed in the semiconductor material between the second input and the second output of the first optical coupler;
an insulating region disposed between the first and second optical waveguides to provide a coupling region in the semiconductor material between the first and second optical waveguides, the coupling region having a first coupling length for the first optical beam directed into the coupling region, the coupling region having a second coupling length for the second optical beam directed into the coupling region.

20. The apparatus of claim 10 further comprising a laser disposed in the semiconductor material to provide the first optical beam to the first input of the first optical coupler.

21. A system, comprising:
a pump laser to generate a first optical beam of a first wavelength having a first power level;
a first optical coupler defined in a semiconductor material, the first optical coupler including first and second inputs and first and second outputs, the first input of the first optical coupler optically coupled to receive the first optical beam;
a first ring resonator defined in the semiconductor material with the second output of the first optical coupler optically coupled to the second input of the first optical coupler through the first ring resonator, the first optical coupler to transfer the first optical beam to the second output of the first optical coupler, the first optical coupler to transfer the first optical beam received at the second input of the first optical coupler to the first output of the first optical coupler, wherein the first power level is sufficient to cause emission of a second optical beam of a second wavelength when the first optical beam is propagated in the first ring resonator, the first optical coupler to transfer most of the second optical beam received at the second input of the first optical coupler to the second output of the second optical coupler; and
an optical receiver optically coupled to the first output of the first optical coupler to receive a portion of the second optical beam leaked from the first optical coupler.

22. The system of claim 21 wherein the laser is disposed in the semiconductor material.

23. The system of claim 21 wherein the first optical beam causes stimulated Raman scattering (SRS) in the first ring resonator.

24. The apparatus of claim 23 wherein the second optical beam has a frequency that is substantially equal to a Stokes frequency of the SRS that occurs in the first ring resonator.

25. The system of claim 21 further comprising a second optical coupler defined in the semiconductor material, the second optical coupler including an input and first and second outputs, the input of the second optical coupler optically coupled to the first output of the first optical coupler, the second optical coupler to transfer the first optical beam received at the input of the second optical coupler to the first output of the second optical coupler, the second optical coupler to transfer the portion of the second optical beam leaked from the first optical coupler and received at the input of the second optical coupler to the second output of the second optical coupler.

26. The system of claim 25 further comprising:
a third optical coupler defined in the semiconductor material, the third optical coupler including first and second inputs and first and second outputs, the first input of the third optical coupler optically coupled to the first output of the second optical coupler; and
a second ring resonator defined in the semiconductor material with the second output of the third optical coupler optically coupled to the second input of the third optical coupler through the second ring resonator, the third optical coupler to transfer the first optical beam received at the first input of the third optical coupler to the second output of the third optical coupler, the third optical coupler to transfer the first optical beam received at the second input of the third optical coupler to the first output of the third optical coupler, wherein the first power level is sufficient to cause emission of a third optical beam of a third wavelength when the first optical beam is propagated in the third ring resonator, the third optical coupler to transfer most of the third optical beam received at the second input of the third optical coupler to the second output of the third optical coupler.

27. The system of claim 26 further comprising a fourth optical coupler defined in the semiconductor material, the fourth optical coupler including an input and first and second outputs, the input of the fourth optical coupler optically coupled to the first output of the third optical coupler, the fourth optical coupler to transfer the first optical beam received at the input of the fourth optical coupler to the first output of the fourth optical coupler, the fourth optical coupler to transfer a portion of the third optical beam leaked from the second ring resonator and received at the input of the fourth optical coupler to the second output of the fourth optical coupler.

28. The system of claim 26 wherein a round trip distance through the first ring resonator is different than a round trip distance through the second ring resonator.

29. The system of claim 28 wherein the second wavelength is different than the third wavelength.

* * * * *